US010618510B2

(12) United States Patent
Stenson (10) Patent No.: US 10,618,510 B2
(45) Date of Patent: Apr. 14, 2020

(54) PLUG-IN HYBRID ELECTRIC VEHICLE SYSTEM (71) Applicant: Inventev LLC, Novi, MI (US)

(72) Inventor: David J. Stenson, Novi, MI (US)

(73) Assignee: INVENTEV, LLC, Detroit, MI (US)

( * ) Notice: Subject to any disclaimer, the term of this patent is extended or adjusted under 35 U.S.C. 154(b) by 320 days.

(21) Appl. No.: 15/131,492

(22) Filed: Apr. 18, 2016

(65) Prior Publication Data

US 2016/0229408 A1 Aug. 11, 2016

Related U.S. Application Data (62) Division of application No. 13/909,798, filed on Jun. 4, 2013, now Pat. No. 9,315,187.

(60) Provisional application No. 61/810,973, filed on Apr. 11, 2013, provisional application No. 61/655,263, filed on Jun. 4, 2012.

(51) Int. Cl.
*B60W 20/10* (2016.01)
*B60K 6/445* (2007.10)
*B60W 20/12* (2016.01)
*B60K 25/06* (2006.01)
*B60W 20/40* (2016.01)
*B60W 30/188* (2012.01)

(52) U.S. Cl.
CPC ............ *B60W 20/10* (2013.01); *B60K 6/445* (2013.01); *B60K 25/06* (2013.01); *B60W 20/12* (2016.01); *B60W 20/40* (2013.01); *B60W 30/1888* (2013.01); *B60W 2530/14* (2013.01); *B60W 2540/04* (2013.01); *B60Y 2400/214* (2013.01); *Y02T 10/6239* (2013.01); *Y02T 90/14* (2013.01); *Y10S 903/902* (2013.01); *Y10T 477/23* (2015.01)

(58) Field of Classification Search
CPC ... B60K 6/445; B60K 25/06; B60W 30/1886; B60W 30/1888; B60W 20/10; B60W 20/40
See application file for complete search history.

(56) References Cited

U.S. PATENT DOCUMENTS

| 5,202,617 A * | 4/1993 | Nor ........................... B60L 3/12 320/109 |
| 2002/0137596 A1* | 9/2002 | Markyvech ........... B60W 10/02 477/83 |
| 2002/0144848 A1* | 10/2002 | Schulte .................... B60K 6/40 180/65.25 |
| 2003/0059654 A1* | 3/2003 | Hsu ..................... B60L 11/1881 429/420 |
| 2003/0060328 A1* | 3/2003 | Beaty .................... B60W 10/06 477/109 |

(Continued)

FOREIGN PATENT DOCUMENTS

WO WO-2011/112233 A2 9/2011

*Primary Examiner* — Frank B Vanaman
(74) *Attorney, Agent, or Firm* — Fishman Stewart PLLC (57) ABSTRACT A plug-in hybrid electric vehicle system employs an improved integrated propulsion device, a drive system and battery management system that is operable to be used in the commercial vehicle business. The vehicle system is operable to provide optimal performance for particular fleet applications by taking into consideration driving patterns and load demands. The vehicle system also provides a drive for auxiliary equipment for work vehicles and driver selectable driving modes for when a vehicle encounters different driving demands.

20 Claims, 4 Drawing Sheets (56) References Cited

U.S. PATENT DOCUMENTS

| | | | | |
|---|---|---|---|---|
| 2004/0094230 | A1* | 5/2004 | Ono | F17C 6/00 |
| | | | | 141/286 |
| 2006/0250902 | A1* | 11/2006 | Bender | B60K 6/46 |
| | | | | 369/1 |
| 2006/0266564 | A1* | 11/2006 | Perlman | B60L 11/123 |
| | | | | 180/2.1 |
| 2010/0151989 | A1* | 6/2010 | Read | B60K 6/12 |
| | | | | 477/4 |
| 2013/0015700 | A1* | 1/2013 | Ichikawa | H04L 25/028 |
| | | | | 307/9.1 |

* cited by examiner

PLUG-IN HYBRID ELECTRIC VEHICLE SYSTEM

CROSS-REFERENCE TO RELATED APPLICATIONS

This application is a Divisional Application and claims the benefit of U.S. application Ser. No. 13/909,798 filed on Jun. 4, 2013, now U.S. Pat. No. 9,315,187, issued Apr. 19, 2016, which claims priority to U.S. Provisional Application No. 61/810,973 filed on Apr. 11, 2013 and U.S. Provisional Application No. 61/655,263 filed on Jun. 4, 2012, each of which is incorporated herein in its entirety.

FIELD OF TECHNOLOGY

A plug-in hybrid electric vehicle (PHEV) system is presented, and in particular, improvements to a PHEV drive system, battery system, auxiliary system, and associated components of a PHEV.

BACKGROUND AND SUMMARY

Hybrid electric vehicles are used in the passenger car market and are continuing to expand in the marketplace globally with much success. However, use of hybrid electric vehicles in commercial fleets, such as commercial trucks, vans, utility vehicles, is not well developed which has created opportunities for those interested in developing improved systems for such commercial applications. Also, in the commercial fleet vehicle market, plug-in hybrid electric vehicles are not well known as engineering barriers continue to exist which have prevented any scaled application of a PHEV into that market.

One of the problems with the use of PHEVs in the commercial truck market is that fleet vehicles in different business settings require certain performance requirements. For example, in the standard internal combustion engine (ICE) commercial truck business, ICEs are utilized as the primary engine plant for propelling a commercial vehicle for both long distance and short distance applications. In particular, a short distance application could be a UPS® truck, a FedEx® truck, a local delivery truck, a utility vehicle, a U.S. postal office vehicle, or the like. Many commercial vehicles will travel in a given day a predetermined route through the city or countryside. The driver routinely knows her exact stops and the number of miles to be traveled each day. Thus, in many of these commercial applications the company that operates these fleet vehicles understands a preset driving pattern which is predictable.

The use of an internal combustion engine in fleet operations is very inefficient and costly, particularly in view of the increase in diesel fuel and gasoline prices. It would be desirable to provide a PHEV system for commercial fleet vehicle applications that utilizes an integrated propulsion device including an internal combustion engine in combination with electric machines to satisfy peak vehicle load needs as well as to reduce energy consumption. Over a fixed battery capacity purely electric vehicle, this combination also extends the usable range for use variations such as peak seasonalities or for emergency response.

It would also be desirable to provide a vocational use power take-off system that is powered by an integrated propulsion device. In this instance the integrated propulsion device can be an internal combustion engine that is combined with one or more electric movers. The electrically driven power take-off system that is powered by the integrated propulsion device can be used for providing power to auxiliary equipment where it is desirable to have a vehicle that is capable of not only traveling down the road, but also to be utilized as a work vehicle, such as a utility truck that requires an auxiliary power supply to provide hydraulic pressure for various vocational equipment or electrical power generation at a job site. Thus, the integrated propulsion device operates not only to propel the vehicle, but also to provide an auxiliary electrical or mechanical power source, on an as needed basis.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Exemplary illustrations of a plug-in hybrid electric vehicle system and method of operation are described herein and are shown in the attached drawings. One such exemplary embodiment includes an integrated propulsion transmission unit whereby a plurality of prime movers is housed in a single case with matched single or multi-speed gear reductions and clutches. A supervisory control system and commanded power electronics can be provided which enable various modes, both stationary and mobile. Functions of the vehicle include mobility of the system for passenger (s), cargo and equipment as well as stationary (typically job site) work.

Another exemplary embodiment includes a driver or supervisory-selectable drive mode for use in connection with a PHEV. A selectable drive mode is a control methodology which enables customization of the overall vehicle behavior to maximize use of stored energy while driving or performing work tasks. This methodology allows a fleet operator to best tailor the vehicle to their specific needs.

Another exemplary embodiment includes a dual exportable power generation system wherein an integrated propulsion unit has the potential to employ two electric machines as generators, expecting to exceed the generation capacity of most single-device generators. Here the integrated propulsion device will work in concert when needed for peak driving loads, as well as being coupled for adding power generation when the vehicle is stationery so as to provide auxiliary electrical or mechanical power for driving accessories.

Figure 1:
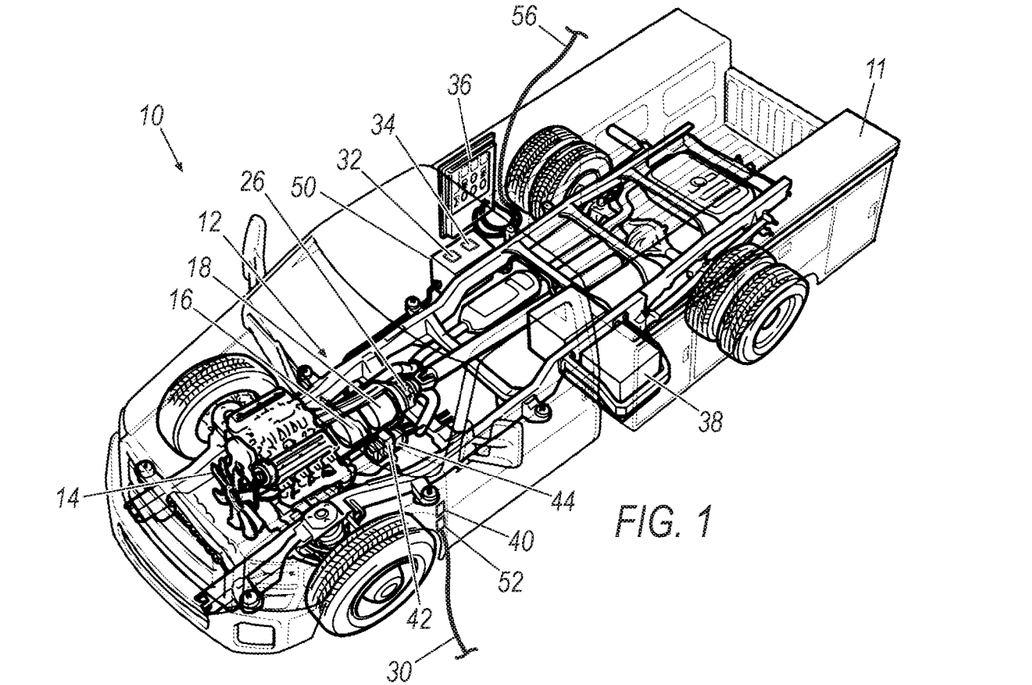
FIG. 1 is a schematic view depicting a battery electric vehicle system.
Figure 2:
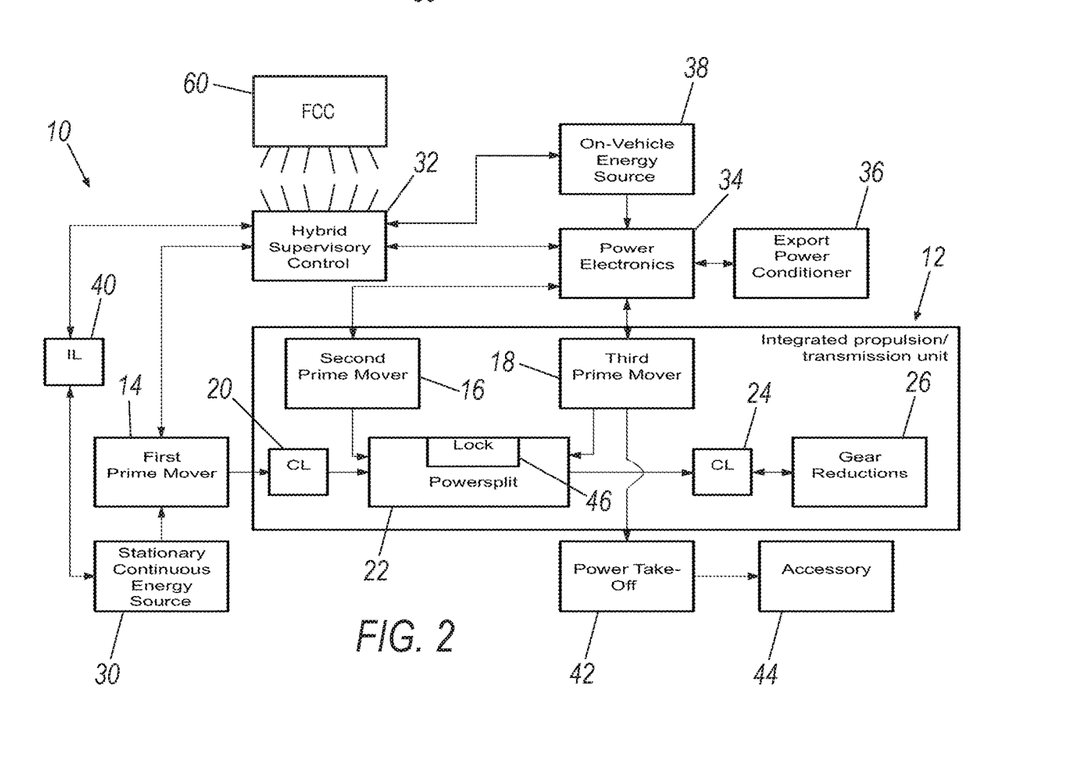
FIG. 2 is a schematic diagram of a logic circuit for a battery electric vehicle system.

A hybrid electric vehicle system is shown in FIGS. 1-8. FIGS. 1 and 2 depict a hybrid electric vehicle system 10 which includes a vehicle 11 and a first prime mover 14 such as but not limited to a diesel, gasoline or natural gas powered internal combustion engine. The system 10 further includes an integrated propulsion transmission unit 12 incorporating a second prime mover 16, a third prime mover 18, a power split device 22 incorporating a locking clutch 46, gear reductions 26, and clutches 20, 24 and 25 (see FIG. 8). Also included in system 10 is a hybrid supervisory control 32, power electronics 34, an export power conditioner 36 and an on-vehicle energy source 38, which could be a battery pack. An interface to a stationary continuous energy source 30 is provided with a coupling 52, an interlock mechanism 40, and a power take-off ("PTO") 42 connected to a vehicle accessory 44 such as hydraulic pump for specialty tools and equipment. Hybrid supervisory control 32 and power electronics 34 are shown integrated in an electronics housing 50. It will be appreciated that the control 32 and power electronics 34 may be housed in separate locations on the vehicle 11.

All of the features of the exemplary embodiments that are shown in FIGS. 1-8 are not required on any given vehicle system as some specialty enabled functions of the embodiments are considered optional for any given vehicle customer. For example, if the primary purpose of hybrid electric vehicle system 10 is for job-site powering of a hydraulic device through the PTO such as an aerial lift, the specialty function of export electrical power may not be enabled or equipped in such application of the embodiment. Likewise, the interface to a stationary continuous energy source 30 may not be needed or appreciated by this PTO-focused usage of the vehicle system. Thus, the system 10 is flexible and may be configured based upon job-site demands.

In one exemplary embodiment, the first prime mover 14 may be powered by various other on-vehicle or off-vehicle energy sources such as liquid fuel tanks, gaseous fuel pressure tanks or hydraulic pressure accumulators. The on-vehicle energy source 38 can be highly interactive in the hybrid electric vehicle system 10 as the primary source of energy for second prime mover 16 and third prime mover 18, and the recipient of energy generated in a hybrid electric vehicle driving mode or through regenerative braking. On-vehicle energy source 38 may also be partially or fully charged from power from the electrical grid or other remote energy generating device such as but not limited to a solar panel or array. Such "plug-in" power would typically be transferred to on-vehicle energy source 38 through a physical connection or a wireless charging system. This on-vehicle energy source 38 may consist of one or more sub-components such as a battery cell, modules, bank of batteries, ultra-capacitors or similar and may include its own control and monitoring system such as a battery management system (BMS).

Second prime mover 16 and third prime mover 18 are typically but not limited to electric machines able to function as both a motor (torque-generating) and as a driven generator (producing electrical power). These may be permanent magnet three-phase AC motors or induction motors commonly specified as generators or traction motors for automotive use. An exemplary embodiment may have second prime mover 16 and third prime mover 18 with a similar or identical peak torque output in the 300 Newton-meter range and a continuous power rating in the 80 kilowatt range with a nominal operating voltage of 320 volts. Other embodiments may have significantly different ratings between second prime mover 16 and third prime mover 18 or be of alternate constructions or device types. When commonly enclosed in integrated propulsion transmission unit 12, individual environmental enclosures of the prime movers may be deleted and more efficient packaging and direct cooling of components such as motor windings is enabled from common cooling systems. Integrated propulsion transmission unit 12 may include a reservoir of cooling and hydraulic fluid such as but not limited to automatic transmission fluid. This fluid may also be the primary lubrication and cooling medium for second prime mover 16 and third prime mover 18.

A stationary continuous energy source 30 is off-vehicle with a coupling 52 connecting it to the vehicle 11 and a means of signaling hybrid supervisory control 32 of its status and physical connection through interlock 40. Beyond the presence of the physical connection, this singular or bi-directional signaling may provide other status of the energy source 30 to the hybrid electric vehicle system 10 or from hybrid electric vehicle system 10 to the stationary continuous energy source 30. Interlock 40 may be integrated with coupling 52 where a common connecting or disconnecting operation to vehicle 11 enables both energy transfer or cutoff and status signal connection or cutoff such as but not limited to a single handle or connector to a receptacle with electrical, gaseous or liquid connection points. Interlock 40 may also be a separate sensing device to detect the presence of a physical connection between vehicle 11 and stationary continuous energy source 30 through coupling 52.

On-board vehicle fuel capacity is often limited to a fuel tank. To overcome fuel limitations, a stationary continuous energy source 30 could be provided as another form of electrical or mechanical energy such as, but not limited to, high voltage DC, pressurized hydraulic fluid, pressurized air or hydrogen able to power a first prime mover 14 to enable power input to integrated propulsion transmission unit 12.

The hybrid supervisory control 32 provides the highest level control of system 10. The hybrid supervisory control 32 includes a microprocessor module of automotive grade and containing internal circuit boards, a central processing unit (CPU), memory and input/output functionality through multi-pin connectors. The hybrid supervisory control 32 includes a housing with mounting features, environmental sealing and cooling features appropriate for its local placement within vehicle 11. Those skilled in art will recognize the interface requirements typical of a vehicle supervisory control module. The hybrid supervisory control 32 and power electronics 34 may be collectively contained within electronics housing 50.

Hybrid supervisory control 32 will communicate to other subsystem controllers within system 10 or in the base vehicle 11. The communication of intended engine start and set points to an engine control unit as integral to the first prime mover 14 subsystem. Such communication may be through a communication network such as but not limited to a Controller Area Network (CAN) bus.

Specific vehicle modes are selected by hybrid supervisory control 32 and executed directly or through other control units or microprocessors not specifically shown in FIGS. 1-8. Inputs to hybrid supervisory control 32 may include vehicle switches to select control preferences or pre-defined preferences selected to best match vehicle control to a given intended use or duty cycle. Hybrid supervisory control 32 may also make dynamic revisions to control parameters or set points based on historical use or trends incorporating a "learning" algorithm. It may further receive settings or parameters transmitted to the hybrid electric vehicle system 10 and originating in remote systems such as those used for route planning and fleet optimization. This remote connection is illustrated in FIG. 2 between fleet control center 60 and hybrid supervisory control 32. The system 10 may also transmit various data regarding status and history to remote fleet control center 60 for tracking, status, or control optimization or similar use.

Export power conditioner 36 may be functionally and physically integrated in other system elements such as power electronics 34. The FIG. 1 embodiment shows export power conditioner 36 physically segregated from power electronics 34. The purpose of export power conditioner 36 is to interface system 10 to an external power load such as a power grid distribution area (not shown). In supplying "utility grade" export power various conditioning may be required depending on the stand-alone nature or specification of the network, installation, facility or devices being supplied with the power. An export power level by the present system 10 could be over 100 kilowatts.

The export power conditioner 36 may access the hybrid electric vehicle system 10 in a different manner such as directly onto a high voltage electrical bus rather than through a power electronic module. With continued reference to FIG. 1, export power conditioner 36 includes an operator interface with gauges, status indicators, switches and connections or other features appropriate to supplying utility grade power to external loads such as, but not limited to, power distribution lines to residences, commercial facilities, remote operations and temporary job-site equipment and power tools. Cables 56 convey export power from system 10 and optionally convey signals to and from system 10. Signals may include, but are not limited to, commands to start or stop the power export from system 10 or communicating a desired set point or conditioning parameters or status of the exported power. Parameters such as voltage ranges, frequencies, transient voltage filtering, current limits and similar may be preset or provided dynamically to export power conditioner 36 from the external load via signals through cables 56 or from hybrid supervisory control 32 via communications internal to system 10.

Internal to the integrated propulsion transmission unit 12 the exemplary embodiment includes an input power split 22 mechanism as a planetary gear set. The split 22 integrates first prime mover 14, second prime mover 16 and third prime mover 18. The first prime mover 14 is connected to the carrier, second prime mover 16 to the sun gear and third prime mover 18 to the ring gear of the planetary gear set. Lock 46 is an internal clutch that connects a sun gear to a carrier selectively creating a 1:1 ratio of the power split 22 planetary gear. Without the lock 46 engaged an effective ratio from ring gear to sun gear may be in the range of 1.5:1 but will be tuned for a specific embodiment based on numerous performance and vehicle parameters.

Also internal to the integrated propulsion transmission unit 12 in the exemplary embodiment is clutch 20 allowing the decoupling of first prime mover 14 while hybrid electric vehicle system 10 functions in an all-electric mobile or stationary mode. Clutch 20 will be engaged to allow first prime mover 14 to transfer power and torque to power split 22 and for integrated propulsion unit 12 to function as an electric starter for first prime mover 14. Also included in integrated propulsion unit 12 is clutch 24 serving to disconnect the vehicle driveline from the power split 22 and thus from the first prime mover 14, the second prime mover 16 and third prime mover 18. Such disconnection allows jobsite functions to be enabled while the system 10 is stationary and not transmitting power and torque to the vehicle driveline. Clutch 24 must be engaged for driving the vehicle 11 in forward or reverse directions and for capturing energy through regenerative braking.

The integrated propulsion unit 12 further includes a clutch 25 that will optionally enable third prime mover to disengage from power split 22. See FIG. 8. This disengagement may be used to independently drive power take off 42 at one rotational speed set point while first prime mover 14 and second prime mover 16 are efficiently generating power at a different operating speed set point. In an embodiment for primary electric propulsion using third prime mover, clutch 25 would also allow on-demand power generation using first prime mover 14 and second prime mover 16 for efficiently recharging on-vehicle energy source 38, in effect creating a series hybrid configuration and unique operating mode.

Clutches 20, 24 and 25 may be of a multi-layer wet clutch type common to internal application in motor vehicle automatic transmissions and engaged and released through control of hydraulic pressure. In the case of clutch 20, a special launch clutch may be selected to enable initial movement of vehicle 11 from a stop without requiring the assist of second prime mover 16 or third prime mover 18. This capability may be selected to provide a special mechanical redundancy enabled by an embodiment that select users may desire as "backup" to an otherwise electrically-biased system 10. This mechanical redundancy allows the vehicle 11 to maintain some mobility functions in the event of specific component failures.

Internal to the integrated propulsion transmission unit 12 are gear reductions 26. The gear reductions 26 may consist of single or multispeed ratios to extend the driving speed range of hybrid electric vehicle system 10 and act in conjunction with a vehicle final drive ratio and the power split 22 ratio for torque multiplication to create specific levels of vehicle performance. Gear reductions 26 may further include shifting capabilities of a pure mechanical, mechanical-electrical or hydraulic nature and corresponding controls. Gear reductions 26 may also include a locking mechanism to mechanically or otherwise prohibit rotation of its output to provide a "Park" functionality as is common in automatic transmissions. In one embodiment, the gear reduction 26 is internal to the integrated propulsion transmission unit 12. However, the functionality of gear reduction 26 could be modular and directly attached to output of integrated propulsion transmission unit 12 or be placed in series elsewhere in the vehicle driveline. Those skilled in prior art would recognize this potentially (but not exclusively) as functionality common to single or multispeed transfer cases.

To further illustrate the functions and modes of hybrid electric vehicle system 10, a commercial truck chassis such as illustrated in FIG. 1 could be retrofitted with key system elements including integrated propulsion transmission unit 12 replacing its standard transmission. Also shown installed is power electronics 34 and hybrid supervisory control 32 integrated in electronic housing 50. Also shown is on-vehicle energy source 38, export power conditioner 36 and connected cables 56. First prime mover 14 is depicted as a gasoline internal combustion engine such as a V10 configuration in a Ford F550 cab-chassis truck. The power take-off 42 is shown, for example, mounted to the side of the integrated propulsion transmission unit 12 with accessory 44 hydraulic pump also attached to the power take off 42. Specialty equipment such as an aerial bucket lift that would receive hydraulic power from accessory 44 hydraulic pump is not depicted in the illustration. Second prime mover 16 and third prime mover 18 are illustrated through the cutaway section of integrated propulsion unit 12. Also internal to integrated propulsion unit 12 are gear reductions 26. The coupling 52 is an interface point to vehicle 11 and is operable to receive energy from energy source 30.

The exemplary embodiment contemplates the integrated nature of integrated propulsion transmission unit 12. Other systems create multiple add-on systems to existing vehicle drivelines creating the disadvantages of requiring more package space, more mounting requirements and more interfaces. In a vehicle underbody, package space is often at a premium and vulnerability of devices and interfaces to damage from on or off-road debris such as rocks, dust and mud and environmental conditions such as rain, snow and ice reduces reliability. Still other prior art creates hybrid propulsion systems from a second prime mover such as a motor-generator mated with an existing automatic or autoshifting manual multi-speed transmission.

The system 10 optimizes underbody package space, has typically fewer interfaces, less vulnerability to debris and environment and enables smaller prime mover devices and fewer gear reductions based on physical connections and flexibility of controls. Other systems further drive mode changes to optimize highway use of an internal combustion engine or restrict all-electric operation to relatively slow speeds, for example under 25 miles per hour. The exemplary embodiments herein emphasize full mobility of the hybrid electric vehicle system 10 including all-electric drive at highway speeds as well as enhanced stationary functions such as "utility grade" export power through export power conditioner 36 and idle-reduced electric-driven PTO through power take off 42. The ability for first prime mover 14 to drive second prime mover 16 and third prime mover 18 as dual generators with the optional flexibility of the stationary continuous energy source 30 creates a new capability for utility grade export power.

A power take off 42 is physically mounted to integrated propulsion transmission unit 12 as would be common with conventional vehicle commercial truck drivelines. Those skilled in art will be familiar with standard interface configurations such as SAE 6-bolt pattern and gearing that transfers rotational power from inside a transmission to a PTO device. An accessory is then directly or remotely mounted to the PTO to use this power for auxiliary functions. The power take off 42 device is often not provided with the base vehicle but its mounting and connection are conveniently enabled. An internal helical or spur gear could be coupled with third prime mover 18 as the point of engagement (gear mesh) with power take off 42. A number of candidate industry standard power take off 42 devices may be chosen to be meshed with this internal driving gear through a standard size access window in the outer case of integrated propulsion transmission unit 12 and secured with bolts into pre-threaded holes of a standard size and configuration.

If job-site demands for PTO exceed the capacity of the on-vehicle energy source the first prime mover 14 can drive second prime mover 16 to generate additional power at an optimized rate and store this energy in on-vehicle energy source 38, independent of the operation and desired speed of the power take off 42. This "extended time" power take-off mode is the basis of the system flow depicted in FIG. 8 and further detailed below. With a higher horsepower demand to support accessory 44 than what third prime mover 18 may be capable of producing singularly, second prime mover and third prime mover are locked and jointly commanded to provide torque through power take off 42.

Figure 5:
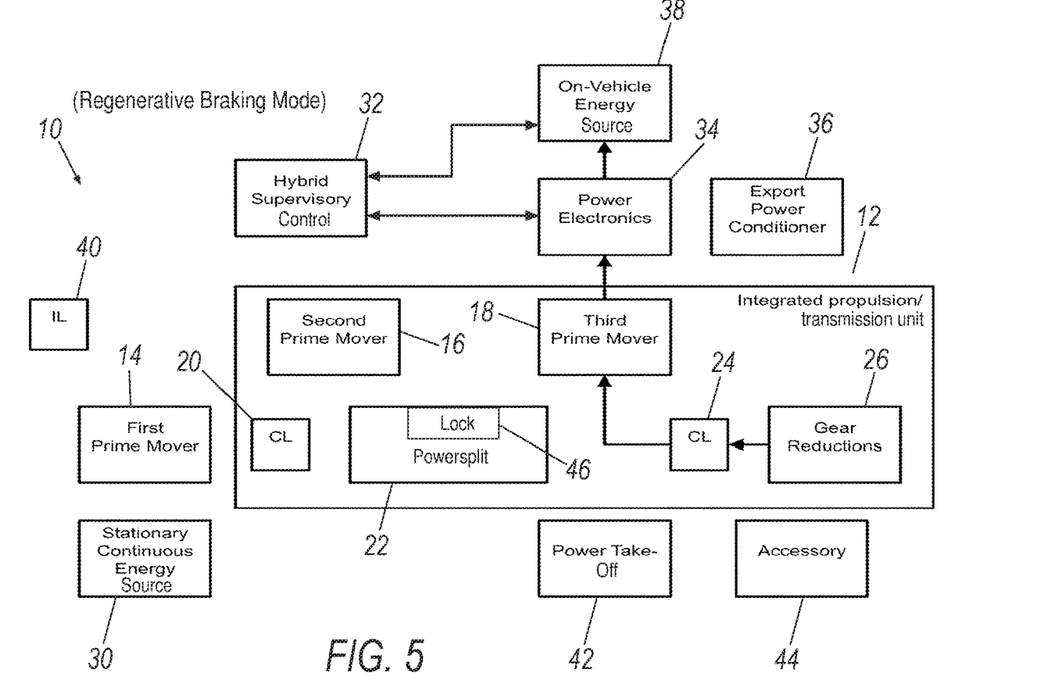
FIG. 5 is a schematic diagram of a logic circuit where the third mover is providing power via a regenerative braking process.

To describe the operation of hybrid electric vehicle system 10 it is important to segregate various operating modes depending on the intended usage at any given time. In general, hybrid electric vehicle system 10 provides an electric drive option that is enabled by an on-vehicle energy source 38 that stores energy from an extended connection to the electric power grid (a "plug-in" hybrid electric vehicle architecture). An extended mobility range is provided by on-board power generation using first prime mover 14 as the range extending power source. Another source of energy is that provided by regenerative braking as depicted in FIG. 5 and described in more detail below. The embodiments herein add significant functionality in stationary modes typically for work purposes or for temporary or emergency power needs. Where current art enables some or limited versions of these capabilities, the present invention serves to optimize a core vehicle drive system to integrate added functionality. Such integration saves package space, lowers component costs and improves reliability.

Typical to pure mobility functions of hybrid electric vehicles, two primary architectures have become well known as prior art. They are series hybrid architecture and parallel hybrid architecture. In a series hybrid system, there is no mechanical connection between a prime mover (typically an internal combustion engine) and the vehicle driveline. A second prime mover (typically a traction motor) provides all torque for vehicle motion either directly to the driveline or through a transmission or gear reduction. The energy may come from an on-vehicle energy storage device such as a battery previously charged or in a charge depleted state from a generator driven by a prime mover.

In a parallel hybrid configuration, a prime mover and second prime mover are typically in a co-axial arrangement to contribute selectively or together in providing torque to the driveline, most often through a transmission. Other variations have emerged for a second prime mover to add torque through other connections (such as "back-driving" through a PTO opening in a transmission) or in a post-transmission modular "bolt-on" arrangement. Most of the known prior art parallel systems preclude the ability for the vehicle to be driven solely with electric power at highway speeds. In these arrangements, the electrical energy is thus a supplement or efficiency enhancement to the baseline drive configuration such as a diesel engine and heavy duty multi-speed transmission.

Figure 7:
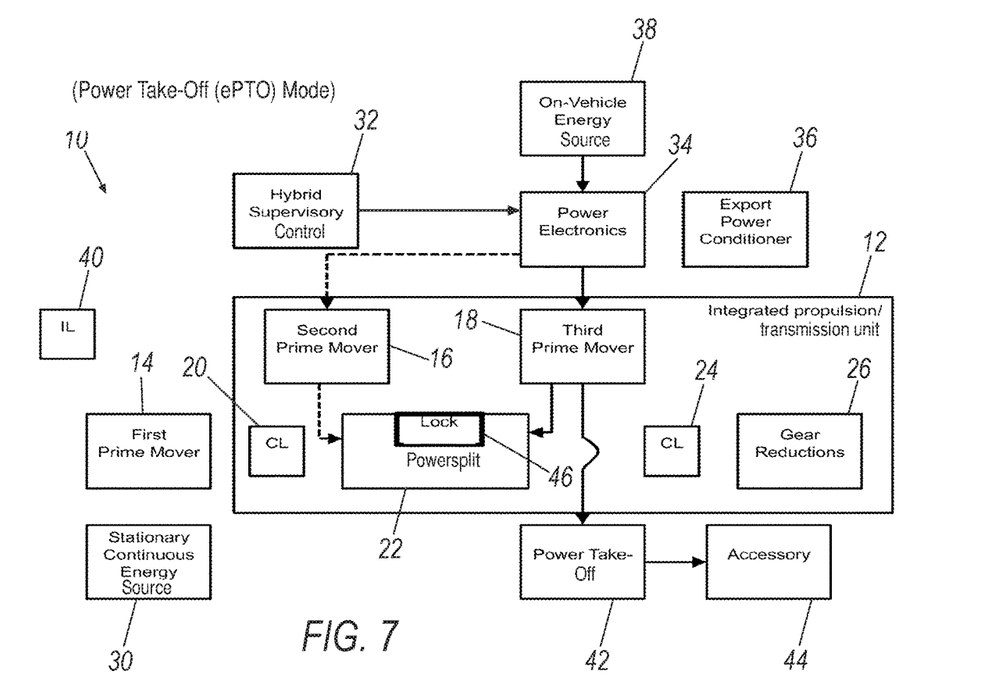
FIG. 7 is a schematic diagram of a logic circuit where the third mover is providing power to a PTO and an associated accessory device.

The integration of the second prime mover 16 and third prime mover 18 into an integrated propulsion transmission unit 12 enables the high-speed all electric drive (not common with prior art parallel configurations) without over-sizing a single traction motor device for peak load demands (a disadvantage of the series configuration). Further, it allows for efficient added stationary job-site functions without duplicate systems and allows the first prime mover 14, second prime mover 16 and third prime mover 18 all to provide torque to the system for peak demand without individually being oversized. This advantage will allow some vehicle uses to avoid the added expense and emissions concerns of a diesel driveline that may be otherwise purchased to accommodate a peak load need. Another reason often cited for an expensive diesel purchase choice is the extended idling some uses require to drive power take off (PTO) systems. The system 10 enables use of the integrated propulsion transmission unit 12 to drive power take off 42 and accessories 44 electrically as depicted in FIG. 7, avoiding significant idling, thus saving fuel and lowering gaseous and noise emissions.

Figure 3:
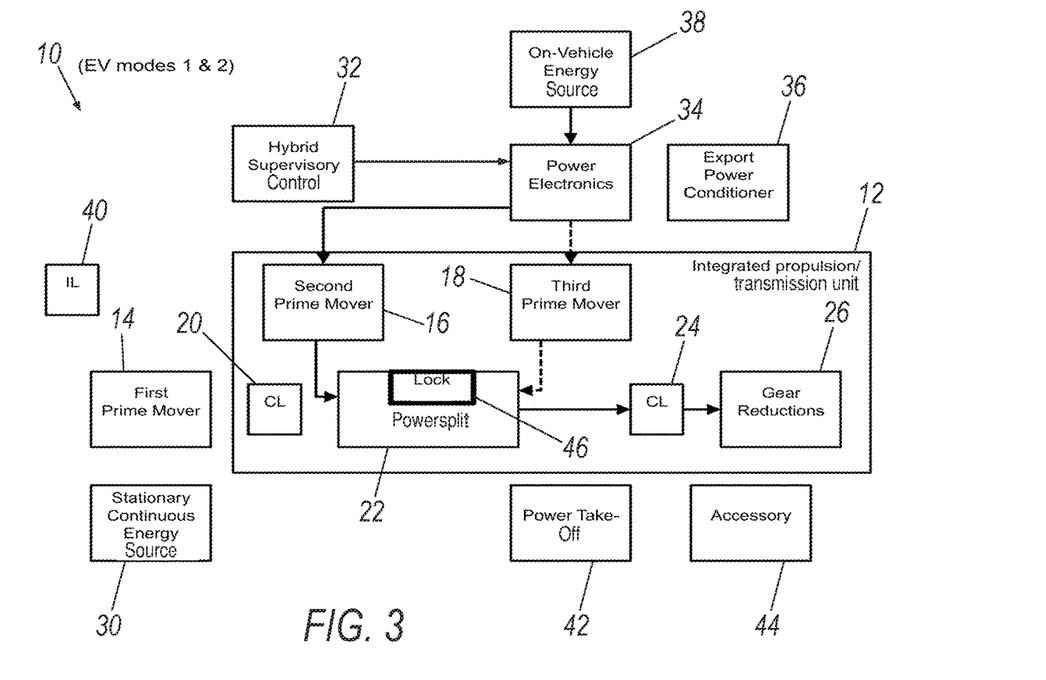
FIG. 3 is a schematic diagram of a logic circuit where a second mover is under power for an electric vehicle system.

Electric Vehicle (EV) modes 1 and 2 are shown in FIG. 3 where the first prime mover 14 is completely decoupled from the system via disengaging clutch 20. As those familiar with the prior art know, a driver's intent for aggressiveness of acceleration is typically determined from an accelerator pedal position sensor. Such data typically obtained through a vehicle communication bus and would be interpreted by hybrid supervisory control 32. EV mode 1 would employ a single motor, in this exemplary embodiment that being second prime mover 16. The current vehicle mobility state such as "at rest," at "low speed" or at "high speed" in combination with the driver intent determines the suitability of mode 1 and the amount of power directed to second prime mover 16. While in EV mode 1 this exemplary embodiment shows hybrid supervisory control 32 commanding power electronics 34 to power second prime mover 16 with energy stored in on-vehicle energy source 38. The lock 46 is engaged resulting in a 1:1 ratio in the power split 22 and passing torque through clutch 24 to gear reductions 26. The choice and shift control of the gear reduction 26 would be further coordinated and commanded by hybrid supervisory control 32. In one exemplary embodiment, an EV mode 1 would be the primary means of providing a reverse function with the second or third prime mover operated in a reverse direction.

EV mode 2 is similar with additional energy supplied from power electronics 34 to third prime mover 18 then to power split 22 as indicated in FIG. 3 by the dashed arrows. With lock 46 engaged, second prime mover 16 and third prime mover 18 are effectively locked together and their combined torque generation as commanded by hybrid supervisory control 32 is intended to satisfy driver's acceleration intent. If conditions are present and sensed by hybrid supervisory control 32 whereby EV mode 2 cannot provide satisfactory power, then starting and engagement of first prime mover 14 may be commanded.

Figure 4:
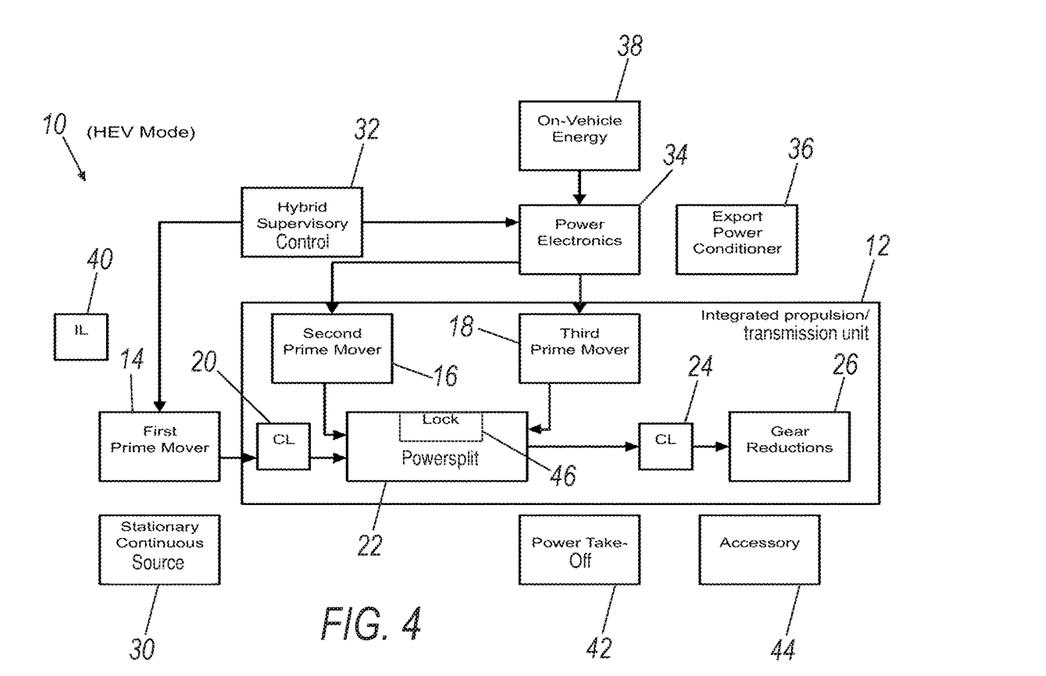
FIG. 4 is a schematic diagram of a logic circuit where the first mover and second mover are in a HEV mode.

Under an exemplary embodiment, EV modes 1 and 2 are the initial "default" modes to enable all-electric mobility and consume stored energy from on-vehicle energy source 38 prior to using first prime mover 14 and its associated fuel supply, typically stored in an on-board fuel tank. The economics of minimizing operating costs would typically dictate the first use of stored electrical energy obtained from a plug-in grid interface prior to consuming more expensive stored fuel (on an equalized energy content basis) such as gasoline or diesel fuels. An exception to this general approach would be made (and control system should support) with a different priority of use for the stored energy in on-vehicle energy source 38. For example, if extensive job-site work using PTO is anticipated and would otherwise require extensive idling and associated fuel consumption and emissions the energy stored in on-vehicle energy source 38 may be preserved through a forced bias to HEV or Range Extender modes as depicted in FIG. 4 and described in detail below. Under this control strategy, the stored electrical energy in on-vehicle energy source 38 is preserved for job-site use. Another example biasing HEV or Range Extender modes may be to intentionally recharge the on-vehicle energy source 38 while driving such as when the vehicle may not be anticipated to have access to a charging station at its next storage location or domicile.

In contrast to EV modes 1 or 2, an HEV mode as depicted in FIG. 4, is initiated by starting the first prime mover 14 through engagement of clutch 20 and powering and subsequent rotation of second prime mover 16 by power electronics 34. Hybrid supervisory control 32 initiates this sequence and also commands the start of first prime mover 14 through its respective controls such as to initiate spark and fuel injection. These controls may or may not be integrated with hybrid supervisory control 32. Once started, first prime mover 14 provides torque through clutch 20 to power split 22. Second prime mover 16 and third prime mover 18 are also engaged with power split 22 providing supplemental torque or generating power depending on operating state of hybrid electric vehicle system 10 and driver command and status of on-vehicle energy source 38 such as battery state-of-charge. In this exemplary embodiment, second prime mover 16 through its planetary gear attachment assists in keeping first prime mover 14 in its rotational speed range of highest efficiency. Lock 46 is disengaged allowing normal gear reduction of the planetary gear within power split 22. Output of power split 22 is in direct connection with third prime mover 18 and coupled to gear reductions 26 through engaged clutch 24. There is no relative rotational speed difference between the output of power split 22 where third prime mover 18 is attached and the input to the gear reductions 26. The choice and shift control of the gear reduction 26 would be further coordinated and commanded by hybrid supervisory control 32.

In another embodiment, a range extender mode is mechanized and is depicted in FIG. 4. This mode however would decouple the third prime mover 18 completely from power split 22 by way of clutch 25 internal to integrated propulsion transmission unit 12. By engaging lock 46 and coupling first prime mover 14 with second prime mover 16 an effective generator set is created similar to series hybrid systems where the output electrical power is provided through power electronics 34 to third prime mover 18. Any excess power generated beyond that needed by third prime mover 18 for vehicle mobility will contribute to charging on-vehicle energy source 38.

Figure 8:
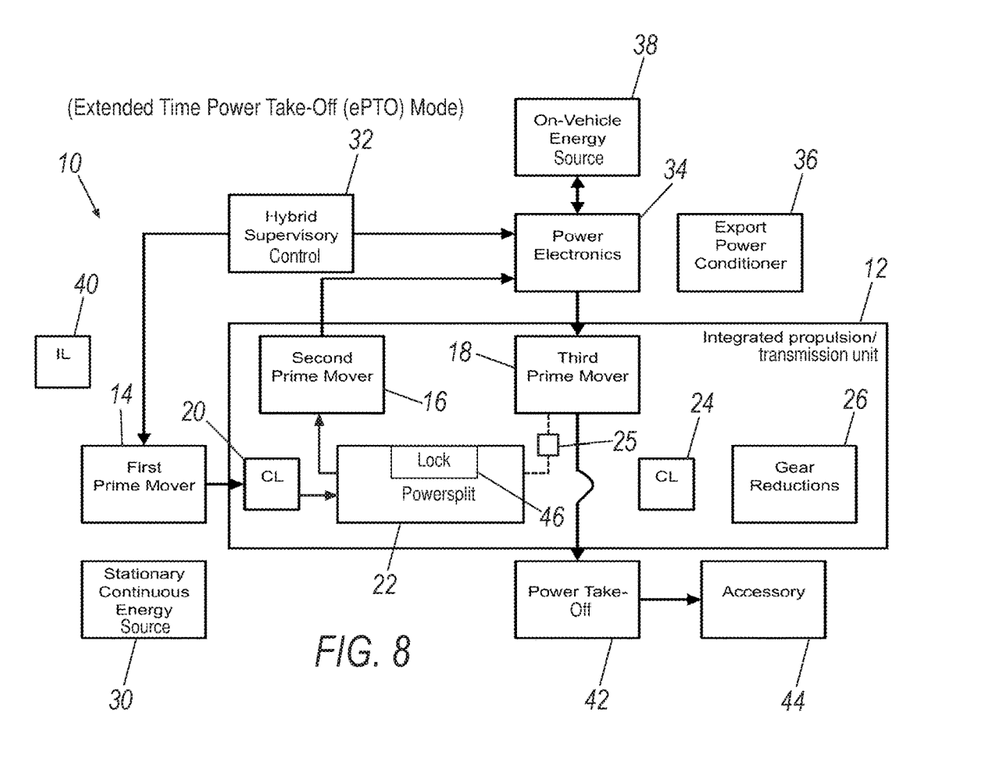
FIG. 8 is a schematic diagram of a logic circuit where an extended time electric power take off mode is desired for situations where additional PTO functionality is needed.

Clutch 25 further enables extended time power take off mode operation as depicted in FIG. 8 and described in detail below. As stated earlier, it is desired for the independent operation of power take off 42 to a desired speed set point dictated by accessory 44 needs. This arrangement enables this independence regardless of first prime mover 14 and second prime mover 16 commanded (and coupled) speeds for greatest power generating efficiency.

Regenerative braking of a hybrid electric vehicle is achieved when energy is at least partially absorbed in an electric machine acting as a generator. In an embodiment depicted in FIG. 5 the regenerative braking mode is enabled through the mechanical links between the vehicle driveline and gear reductions 26 through clutch 24 and driving third prime mover 18 directly. In this mode, third prime mover 18 acts as a generator providing power through power electronics 34 and into the on-vehicle energy source 38. In the case that on-vehicle energy source 38 is at full capacity and otherwise cannot accept additional energy, hybrid supervisory control 32 will command power electronics 34 to not generate additional power and selectively allow first prime mover 14 to be engaged through clutch 20 and provide engine braking alone or in combination with the vehicle's base (typically hydraulic) braking system. In any case, the vehicle's base brakes are considered the primary safety braking system. By capturing energy otherwise lost in the form of heat through friction material, regenerative braking serves to further improve the efficiency of hybrid electric vehicle system 10.

Figure 6:
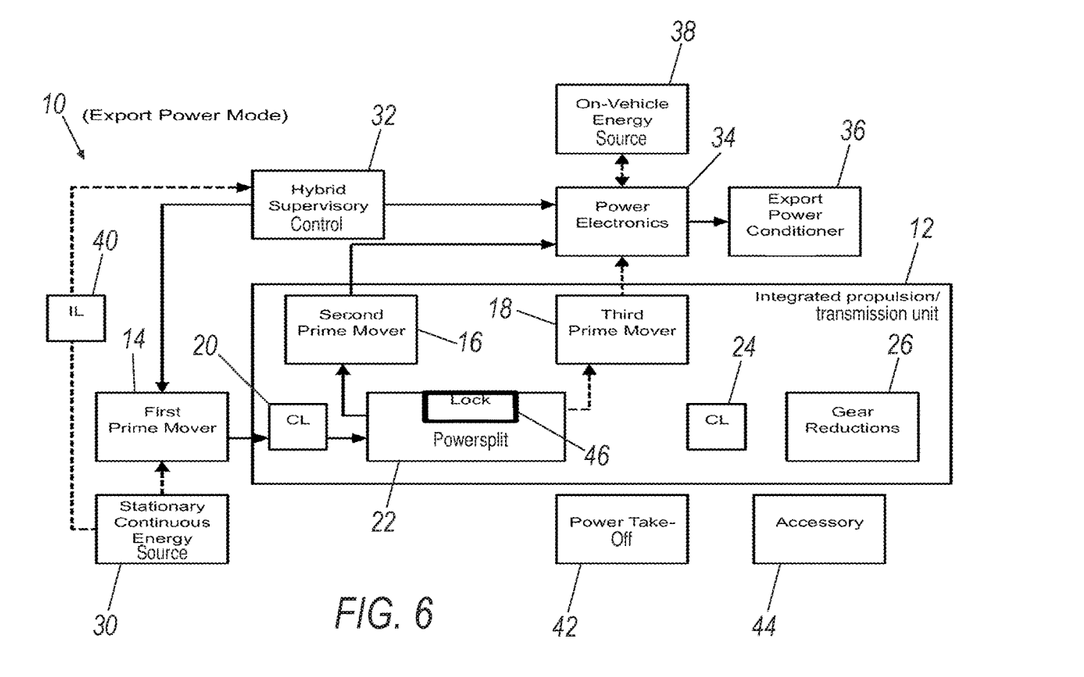
FIG. 6 is a schematic diagram of a logic circuit where the first, second and third movers are working in concert to export power.

Referring to FIG. 6, export power mode of an exemplary embodiment engages first prime mover 14 as singular source of torque to drive second prime mover 16 and optionally third prime mover 18 depending on the level of power output required. This dual generator capacity of integrated propulsion transmission unit 12 is a preferred embodiment of present invention and enables higher levels of power generation than known prior art of a hybrid electric vehicle architecture. Torque from first prime mover 14 is passed through engaged clutch 20 to power split 22. With lock 46 engaged, power split 22 creates a 1:1 ratio effectively coupling second prime mover 16 and third prime mover 18 together and generating AC power. Power electronics 34 channels this energy to export power conditioner 36 for export to external loads and selectively to on-vehicle energy source 38 for charging depending on its present state as typically known to hybrid supervisory control 32.

With continued reference to FIG. 6, stationary continuous energy source 30 may be present and provide continuous "fueling" of first prime mover 14. In this way an extended duty of power generation can be enabled without requiring frequent servicing of the system to provide additional on-vehicle stored fuel. Interlock 40 is provided as an error-proof and safety feature to avoid accidental movement of hybrid electric vehicle system 10 while physically connected to a stationary fuel source. Signals from stationary continuous energy source 30 through interlock 40 and into hybrid supervisory control 32 may provide bi-directional status data in addition to confirming presence of a physical connection. Stationary continuous energy source connections such as natural gas lines are commonplace for permanently installed backup generator units, for example at residential homes. The present disclosure embodies this feature in a vehicle system 10 having significant job-site and mobile power generation applications.

Referring to FIG. 7, a power take off 42 is physically mounted to the side of integrated propulsion transmission unit 12 and further enables mounting of an accessory 44 such as a hydraulic pump. Power take offs and corresponding accessory units are commonplace in commercial trucks to drive specialty equipment such as aerial lifts and dump bodies. Electric power take off (ePTO) mode is enabled with first prime mover 14 turned off and disengaged via clutch 20. Third prime mover 18 and second prime mover 16 are coupled together via lock 46. Hybrid supervisory control 32 commands the mode typically in response to a signal from the auxiliary equipment controls and once determined that hybrid electric vehicle system 10 is not intending to move by command of a driver. Power electronics 34 are commanded to drive third prime mover 18 using stored energy from on-vehicle energy source 38. Providing energy to second prime mover 16 for additional output horsepower is optional.

Referring to FIG. 8, a system 10 having an extended time electric power take off (ePTO) mode is depicted. This mode is selected when on-vehicle energy source 38 is depleted and additional PTO functionality is required for an extended time. The first prime mover 14 is now started through command of hybrid supervisory control 32 engaging of clutch 20 and "starter" rotation of second prime mover 16. The embodiment in FIG. 8 shows third prime mover 18 decoupled from power split 22 via clutch 25 between third prime mover 18 and power split 22 as previously described. In this way, third prime mover 18 can be commanded to a set point speed optimal for supplying rotating power to the accessory 44. Separately, first prime mover 14 and second prime mover 16 can couple as a generator set and operate at a high efficiency point for first prime mover 14. The corresponding electrical power generated by second prime mover 16 is then provided to power electronics 34 for distribution to third prime mover 18 and on-vehicle energy source 38 for storage (charging). In an alternate embodiment, power take off 42 would be driven by the power split 22 system where first prime mover 14, second prime mover 16 and third prime mover 18 are all locked to a common rotational speed and providing this speed to power take off 42.

To determine the optimal real time system mode the system 10 employs several inputs that are used by the hybrid supervisory control 32. In an exemplary embodiment an operator mode preference selector is provided to the operator of system 10. With knowledge of the intended duty of system 10 for a particular period such as a work day the operator can intelligently bias the operator mode to make most efficient or otherwise preferred use of energy stored in on-vehicle energy source 38. In addition, a specific duty of the system 10 for carrying heavier cargo, performing tasks such as towing a trailer or an intended geographic route with more hills or extended grades may dictate a preferred bias of system 10 toward performance over economy on a temporary basis. An operator mode is considered by hybrid supervisory control 32 as a preference for selecting the specific vehicle mode such as EV 1 or HEV as described above.

Examples of preferred operator modes are "performance," "retain energy," and "maximum economy" modes. This is not exhaustive and other embodiments could create other selections and names. It is also not intended to limit present invention to a means of selecting a preferred operator mode. An exemplary embodiment could include a selection device such as a switch on the instrument panel of the vehicle for explicit operator choice at any given time. Still another embodiment would enable hybrid supervisory control 32 to receive a preferred operator mode through vehicle communication to a central fleet control center 60. This embodiment may be attractive to fleet management to provide less discretion to operators of system 10 to maximize efficiency of a vehicle fleet. A fleet control center 60 could also have knowledge of the intended use, operating locations and planned routes for system 10.

In choosing a specific real time system mode, hybrid supervisory control 32 will consider multiple inputs of system 10 status such as a battery state-of-charge, operator intent using signals such as position of a throttle pedal and the selected operator mode. Those skilled in art will be aware of key parameters to sense and respond for system control use for a vehicle. The overlay of preferred operator mode selection will more directly influence choice, sequence and timing of consumption of stored energy through selection of real time system mode particularly considering special job-site functions intended for system 10. The exemplary embodiments herein will directly enable mobility energy management and job-site control behavior.

The hybrid supervisory control 32 will have software and acquire real time data to enable an approximate calculation of total weight of the vehicle, passengers, cargo and potentially trailer, commonly referred to as gross combined weight (GCW). This calculation would consider factors such as, but not exclusive to, actual unloaded vehicle weight, fuel level in on-vehicle tank(s) used by first prime mover 14 and one or more current cycles of experience with energy consumption versus vehicle performance. Vehicle performance may be observed during positive acceleration, constant velocity and negative acceleration (braking). Special emphasis would be placed on performance at low speeds such as initial vehicle launch to minimize other effects such as aerodynamic drag that create a larger uncertainly factor at higher speeds. The use of this calculated GCW for a particular drive cycle will enable adaptive control by hybrid supervisory control 32 to meet performance or efficiency expectations and better approximations of vehicle range considering current levels of stored energy. Without such GCW knowledge or approximations a greater error of anticipated system 10 mobility range or a less effective control by hybrid supervisory control 32 for performance and efficiency would result.

Over extended periods of time, the system 10 may capture and log certain operating data for further analysis. Log battery data serves the purpose of predicting useful subsystem life in system 10 and suitability for a second use and thus a residual value. The expense of on-vehicle energy source 38 in the embodiment where it is a high-capacity lithium ion or similar battery pack makes knowledge of its specific duty cycle in system 10 of special interest. Further, the exposure of specific battery packs to various environmental conditions and their charging and discharging cycles changes their life expectancy to maintain acceptable performance for a given application. A battery system 38 may be used for on-vehicle energy source 38, would typically have its own battery management system (BMS) as a subsystem to system 10 and in constant communication with hybrid supervisory control 32. In an embodiment, system 10 would include an external communication system. These systems have become more commonplace and are sometimes referred to as telematics. With some frequency, or triggered by some pre-determined parameter set points, system 10 would transmit specific usage and environmental exposure data to a fleet control center 60 for decisions related to continued usage in system 10 or to assess residual value for use in an alternate application, perhaps a stationary energy storage application.

In another embodiment, such battery usage data may be captured locally to system 10 over extended periods such as in a data logger for later download. Such download may occur at a predefined maintenance interval, planned lifecycle interval or through more random occurrence. A need is present to understand useful life of higher cost systems such as high energy battery packs. The exemplary embodiments can mitigate risk and not specifically penalize financial calculations for uncertainties that such data and logging could address. Battery packs have been used here as an example but other embodiments may capture data from additional subsystems with similar analytical needs and benefits.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

The invention claimed is:

1. A method of operating a dual purpose hybrid electric vehicle, the method comprising:
   providing a first mover for propelling the vehicle;
   providing a second mover;
   providing a third mover;
   physically engaging the first mover and a gear reduction with a main clutch; and
   physically disengaging the first mover and the gear reduction to direct power to a power split with a locking clutch coupled to the second and third movers, for at least one of:
   exporting power external to the vehicle, and
   activating a power take off device that is powered selectively by the second and third movers using the power split, wherein the power take off device includes a hydraulic pump.

2. The method of claim 1, further comprising providing an export power conditioner for the exporting of power from the third mover.

3. The method of claim 1, further comprising providing a continuous fueling feature for an external energy supply to propel at least one of the first, second and third movers.

4. The method of claim 1, further comprising:
   propelling the vehicle along a road; and
   generating and storing power from the propelling.

5. The method of claim 1, further comprising an interlock in communication with a control member, and the interlock is configured to prevent propelling of the vehicle while it is connected to an energy source external to the vehicle.

6. The method of claim 1, wherein the gear reduction includes mechanical-electrical shifting.

7. A method of operating a vehicle, the method comprising:
   providing a controller, a power take off device, a first mover, a second mover, and a third mover
   physically engaging the first mover and a gear reduction with a main clutch;
   sensing a condition for activating the first, second and third movers;
   physically disengaging the first mover from the gear reduction to direct power to a power split with a locking clutch coupled to the second and third movers, for at least one of:
   exporting power external to the vehicle, and
   activating the power take off device that is powered selectively by the second and third movers using the power split, wherein the power take off device includes a hydraulic pump.

8. The method of claim 7, further comprising providing an export power conditioner for the exporting of power from at least one the first, second and third movers.

9. The method of claim 7, further comprising providing a continuous fueling feature for an external energy supply to propel at least one of the first, second and third movers.

10. The method of claim 7, further comprising driving, la the first and third movers locked and jointly commanded to provide torque through the power take off device, an accessory device.

11. The method of claim 7, further comprising:
    propelling the vehicle along a road; and
    generating and storing power from the propelling.

12. The method of claim 7, further comprising preventing, with an interlock in communication with a control member, propelling of the vehicle while connected to an energy source external to the vehicle.

13. The method of claim 7, wherein the gear reduction includes mechanical-electrical shifting.

14. A method of a hybrid electric vehicle, comprising:
providing a controller, a power take off device, a first mover, a second mover and a third mover;
activating, by the controller, the first mover in response to a first condition;
activating, by the controller, the second and third movers in response a second condition;
physically engaging the first mover and a gear reduction including a main clutch;
physically disengaging the first mover and the gear reduction to direct, by the controller, power from the first mover to a power split with a locking clutch coupled to the second and third movers, for at least one of:
exporting power external to the vehicle, and
activating the power take off device that is powered selectively by the second and third movers using the power split, wherein the power take off device includes a hydraulic pump.

15. The method of claim 14, further comprising driving, by the first and third movers locked and jointly commanded to provide torque through the power take off device, an accessory.

16. The method of claim 14, storing energy, by a rechargeable battery system, to provide power on demand.

17. The method of claim 14, delivering, by a control panel and a power outlet, utility grade power external to the hybrid electric vehicle.

18. The method of claim 14, further comprising supplying, by a continuous fueling feature, an external energy supply to propel at least one of the first, second and third movers.

19. The method of claim 14, further comprising:
propelling the hybrid electric vehicle; and
generating power from the propelling.

20. The method of claim 14, further comprising providing at least two different modes based on predetermined conditions according to a hybrid supervisory controller, the at least two different modes being at least two of an electric vehicle (EV) mode, a hybrid electric vehicle (HEV) mode, a range extender mode, an energy storage mode, a regenerative braking mode, an export power mode, and a power take off (PTO) mode.

* * * * *

UNITED STATES PATENT AND TRADEMARK OFFICE
CERTIFICATE OF CORRECTION

PATENT NO.         : 10,618,510 B2
APPLICATION NO.    : 15/131492
DATED              : April 14, 2020
INVENTOR(S)        : David J. Stenson It is certified that error appears in the above-identified patent and that said Letters Patent is hereby corrected as shown below:

In the Claims

Column 14, Claim 10, Line 1, delete "la" and insert -- by --

Signed and Sealed this
Second Day of June, 2020

Andrei Iancu
*Director of the United States Patent and Trademark Office*